J. B. WAGNER.
BARREL HEADING MACHINE.
APPLICATION FILED FEB. 6, 1909.

983,329.

Patented Feb. 7, 1911.
10 SHEETS—SHEET 1.

WITNESSES
Frederick Germanop.
Frances E. Blodgett.

INVENTOR
Joseph B. Wagner,
BY
Runcie M. Everets,
ATTORNEY.

THE NORRIS PETERS CO., WASHINGTON, D. C.

J. B. WAGNER.
BARREL HEADING MACHINE.
APPLICATION FILED FEB. 6, 1909.

983,329.

Patented Feb. 7, 1911.
10 SHEETS—SHEET 3.

WITNESSES
Frederick Germann Jr.
Francis E. Blodgett.

INVENTOR
Joseph B. Wagner
BY
Russell M. Everett,
ATTORNEY.

J. B. WAGNER.
BARREL HEADING MACHINE.
APPLICATION FILED FEB. 6, 1909.

983,329.

Patented Feb. 7, 1911.
10 SHEETS—SHEET 4.

WITNESSES

INVENTOR
Joseph B. Wagner,
BY
ATTORNEY.

J. B. WAGNER.
BARREL HEADING MACHINE.
APPLICATION FILED FEB. 6, 1909.

983,329.

Patented Feb. 7, 1911.
10 SHEETS—SHEET 7.

WITNESSES

INVENTOR
Joseph B. Wagner,
BY
Russell M. Everett,
ATTORNEY.

J. B. WAGNER.
BARREL HEADING MACHINE.
APPLICATION FILED FEB. 6, 1909.

983,329.

Patented Feb. 7, 1911.
10 SHEETS—SHEET 8.

WITNESSES

INVENTOR
Joseph B. Wagner,
Russell M. Everett,
ATTORNEY.

J. B. WAGNER.
BARREL HEADING MACHINE.
APPLICATION FILED FEB. 6, 1909.

983,329.

Patented Feb. 7, 1911.
10 SHEETS—SHEET 10.

WITNESSES

INVENTOR
Joseph B. Wagner,
BY
Russell M. Everett,
ATTORNEY.

UNITED STATES PATENT OFFICE.

JOSEPH B. WAGNER, OF YONKERS, NEW YORK.

BARREL-HEADING MACHINE.

983,329.  Specification of Letters Patent.  Patented Feb. 7, 1911.

Application filed February 6, 1909. Serial No. 476,347.

*To all whom it may concern:*

Be it known that I, JOSEPH B. WAGNER, a citizen of the United States, residing at Yonkers, in the county of Westchester and State of New York, have invented certain Improvements in Barrel-Heading Machines of which the following is a specification.

This invention relates to the manufacture of barrels, kegs and similar packages, and more particularly to the insertion of the head which constitutes the bottom of the package and the hooping of the two ends of the package, after the staves have been assembled and hooped at their middle portions.

The objects of the invention are to enable the work to be done rapidly and with great economy of labor and power; to secure a simple construction which shall operate easily and without undue wear or breakage of parts; to secure a machine which shall not distort the barrel or other package by abnormal strains thereon in its operation, nor tend to break or otherwise injure the staves or form of the package, to thus prevent the waste and loss now common in machines used for similar work; to obtain a heading-up machine which can be employed for either slack or tight barrels, kegs or other packages, and to obtain other advantages and results as may be brought out in the following description.

Referring to the accompanying drawings, in which like numerals of reference indicate corresponding parts in each of the several figures.

In said drawings, 20 indicates the base of my improved machine, comprising a boxlike casting or castings adapted to rest upon a suitable solid foundation and be secured thereto, as by lugs 21. Different portions of this base 20 are of different heights or different horizontal dimensions to support different parts of the machine, as the front or main base portion 22 for holding the barrel, a lower middle portion 23 for certain actuating mechanism hereinafter described, and an extreme rear end portion 24 for the standard which supports the hoop driving means. These different portions of the base 21 can obviously be integral as shown or cast in different pieces suitably connected together.

Figure 1:
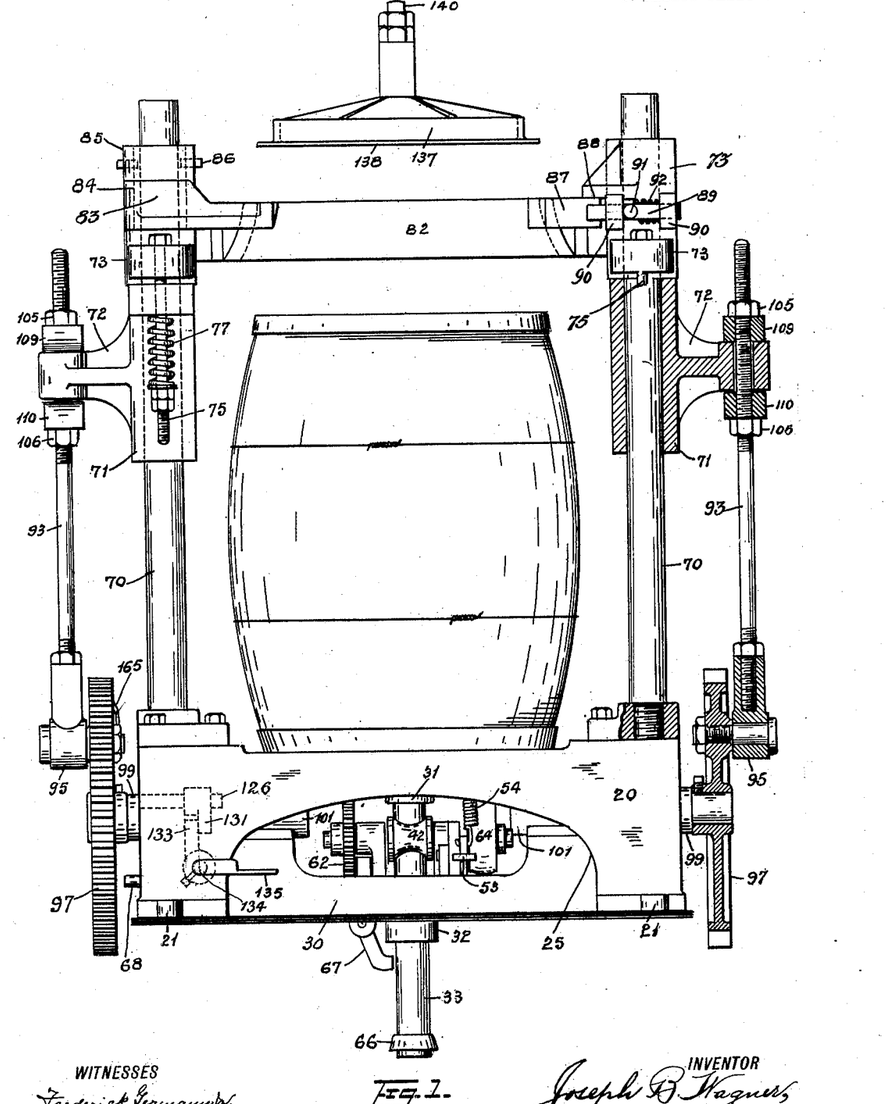
Figure 1 is a front elevation of my improved machine, with a barrel placed therein and about to be operated upon.

The front or main portion 22 of the base is cut away as at 25, to form in its wall at the front of the machine a large opening, and at the opposite side or end walls of the said base portion 22 are other openings 26, 26, which extend upward from the lower edge of the casting. From one of the said openings 26 to the other extends a supplemental plate 27 which at its ends has feet 28 disposed in substantially the planes of the sides of the base portion 22 and secured thereto as by lugs 29. This supplemental plate 27 leaves the upper parts of the apertures 26 open, and for its middle portion 30 the said plate 27 is offset downwardly, as shown most clearly in Fig. 4. The top of the base portion 22, and the said supplemental plate 27 provide central vertically alined bearings 31, 32 respectively, for a plunger 33. The barrel being headed is adapted to stand upon the base portion 22 as shown in Fig. 1, and a table 34 is fixed upon the top of the plunger 33 to lie within the barrel and carry the head which is to be inserted in the barrel. Said table 34 preferably has a socket 35 interiorly threaded to receive the upper end of the plunger, and thus enable small adjustments to be made. Furthermore the plunger 33 preferably comprises a piece of tubing which overlaps telescopically upon the socket of said table 34, and at a distance from its upper end is provided with a fixed interior collar 36. Through the said collar 36 extends slidably a stem 37, which at its upper end is screw-threaded to enter the table socket. A spring 38 on said stem between the collar 36 and a flange 39 on the stem normally holds said stem projecting outward from the end of the plunger, a head 40 on the inner end of the stem preventing its escape. Thus the table can yield with respect to the plunger 33 under the blows of the hoop driving mechanism or any other similar downward strain. For elevating the said table 34, friction rollers 41 and 42 are arranged on opposite sides of the plunger 33, as shown in Figs. 4 to 9 inclusive, more especially. Each of these friction rollers is mounted in a bracket 43 or 44, and these brackets are fulcrumed as at 45 and 46 upon the supplemental plate 27 of the base portion 22. These brackets are provided with arms 47 and 48 which extend toward each other, and overlapping are slotted to receive a pin 49 which also passes through a link 50 depending from a foot lever 51 which is fulcrumed as at 52 to the top of the interior of the base portion 22 and projects at its other end through the opening 25 to form a treadle 53 at the front of the machine. This treadle is normally held upward by a spring 54, such upward movement being limited by a stop 55 on one of the friction roller brackets, as 43. Obviously by depressing the foot treadle 53, the brackets 43, 44 are swung to cause their friction rollers 41, 42 to grip the plunger 33 from opposite sides and give it an upward vertical movement as hereinafter described. The said friction rollers may be of any suitable construction, but I have shown them as each comprising a series of annular sections 56 of fiber, leather or like material held between washers 57, 57 with screws 58 extending through the whole, as shown more particularly in Figs. 8 and 9. Each friction roller is keyed to a shaft mounted in the bracket and said shafts 59, 60 have intermeshing star gears 61, 62 upon their ends at one side of the brackets. The other ends of the said shaft have outside the bracket one a collar 63 and the other a pulley 64 adapted to receive a belt 65 extending through the top of the base portion 22 from certain main driving means hereinafter more fully described. The teeth of the gears 61, 62 are long enough to permit the movement necessary to the friction rollers. Thus the operator by placing his foot upon the treadle 53 after a barrel has been put in place, can very quickly elevate the table 34, and thus bring a barrel head thereon into exact alinement with the croze at the top of the barrel. When the table is sufficiently elevated, a ring 66 on the lower end of the plunger 33 serves as a stop, and a dog 67 upon the supplemental plate 27 hooks beneath said ring 66 to retain the table in elevated position. This dog 67 is controlled by a rod 68 sliding horizontally in bearings of the supplemental plate 27 and normally held outward by a spring 69 to keep the dog in position to lock with the ring 66, as shown more clearly in Fig. 4.

At opposite sides of the base portion 22, posts 70 extend upward from the top of said base portion, and provide slideways for sleeves each comprising upper and lower sections 73, 71. Each lower section 71 has an arm 72 preferably projecting outward or away from a barrel between the two posts, and the two sections 71, 73 of each sleeve have at their adjacent ends pairs of opposite radial arms through which bolts 75, 76 extend to connect the sections, springs 77, 78 beneath the heads of said bolts permitting a limited movement of the two sections 71 and 73 away from each other under excessive strain, while normally holding them close together as a unit.

Figure 15:
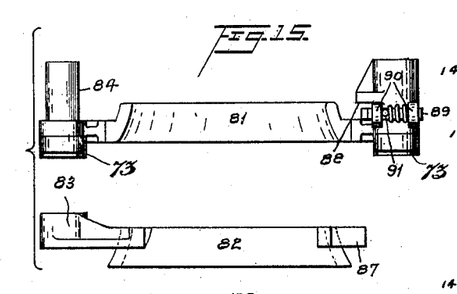
Fig. 15 is a perspective view of the two sections of a certain compressing ring, slightly separated.

The upper sections 73 of the two sleeves have integral with themselves one half 81 of a downwardly-flaring ring adapted when forced down upon the exterior of the upper end of the barrel to compress the staves thereof inwardly. The other half 82 of this ring has at one end an eye or hinge 83 adapted to pivotally receive the upper reduced portion 84 of one of the said upper sleeve sections 73, see Fig. 15. A collar 85 upon said reduced portion 84 above the said eye 83, see Fig. 1, and locked on said reduced portion 84 by means of screws 86, prevents upward escape of this end of the swinging or hinged half of the ring. The other end of the said hinged half 82 of the ring is adapted as at 87 to swing beneath a shoulder 88 upon the other upper section 73, and be retained therebeneath by a latch 89 sliding in lugs 90 on said section 73 and adapted to be retracted by a fingerpiece 91 against the power of a spring 92 which normally holds the latch in locking engagement with the end 87 of the swinging half 82 of the ring. It will be understood that the said ring is split, or made in halves as described, in order that a barrel may be readily released even after it has been hooped above said ring. For moving the said compressing ring downward and up again, the arms 71 are connected by rods 93 to crank pins 95 projecting from gear wheels 97 fast upon shafts 99 which are mounted in horizontal position in bearings 101 upon the high end portions of the supplemental plate 27. Said bearings are preferably detachable and each composed of two boxes with a collar 103, fast upon the shaft between said boxes to prevent longitudinal movement of the shaft. Said shafts 99 thus project through the end or side openings 26 of the main portion 22 of the base of my machine.

The rods 93, extending from the crank pins to the arms 71, have threaded upper ends each of which passes through a hole in the arm which is widened horizontally at its lower end to allow for the swing of the rod, and jam nuts 105, 106, are arranged above and below the arm with threaded blocks 109, 110 between said jam nuts and the arm provided with rounded faces against said arm. Thus when the crank pins 95, stand in their highest positions as shown in Fig. 1, the compressing ring is elevated to allow a barrel to be inserted or removed, and when the gears 97, are given a half turn to bring said crank pins at their lowest points the ring is forcibly drawn down upon a barrel to compress the staves against the barrel head or top ready to receive the end hoop. For turning the said gears 97, I provide the means next described.

Upon the rear part of the main portion 22 of the base is mounted a horizontally disposed shaft 113, carrying gears 114, which mesh with the gear wheels 97, and serve to drive the same in unison. I have shown these gears 114 as sufficiently smaller than the gears 97, so that one complete rotation of them gives the gears 97, one-half a complete rotation. The shaft 113 has at one extreme end a gear 116 which is connected by an intermediate gear 117 with a driving gear 118 fast on a shaft 119 which carries a pulley 120 for the main driving belt. It is from this driving shaft 119 by means of a small pulley 121 thereon that power is communicated through the belt 65 above described to rotate the friction rollers which raise the barrel head carrier or table. An idle pulley, see Fig. 6, holds the belt 65 in proper position.

For enabling the compressing ring to move from its upper to its lower position or vice versa, and to remain stationary at all other times, I have provided the clutch means and trip therefor next to be described. The gear 116 is loose upon the shaft 113 and carries upon its hub, next the adjacent gear 114 which is fast upon the shaft 113, a ratchet or toothed wheel 122. A pawl 123 pivoted upon the said gear 114 is normally held by a spring 124 in clutched or locked relation with the toothed wheel 122 so that rotation thereof will turn the gear 114 and thus the shaft 113. The pawl 123, however, has a long projecting end 125 which is adapted to engage the end of a rod 126 and disengage the pawl from the ratchet wheel by continued turning of said parts. This disengagement is timed to occur so as to leave the compression ring alternately at its upper or lower position. The said rod 126 is mounted to slide longitudinally and horizontally from side to side of the machine in lugs 127, 128 upon the middle portion 23 of the base of the machine. A spring 129 between the lug 128 and a stop 130 on the rod 126 normally slides said rod into the path of the pawl 123, so that the compression ring will be stopped. For withdrawing said rod 126, to allow the compression ring to be moved either upward or downward, a finger 131 upon the inner end of the rod 126 projects downward through an aperture 132 in the top of the base casting and is engaged by an arm 133 fast on a rock shaft 134, extending out through the front of the main portion 22 of the base of the machine and adapted to be oscillated by means of a radially projecting treadle 135.

Figure 4:
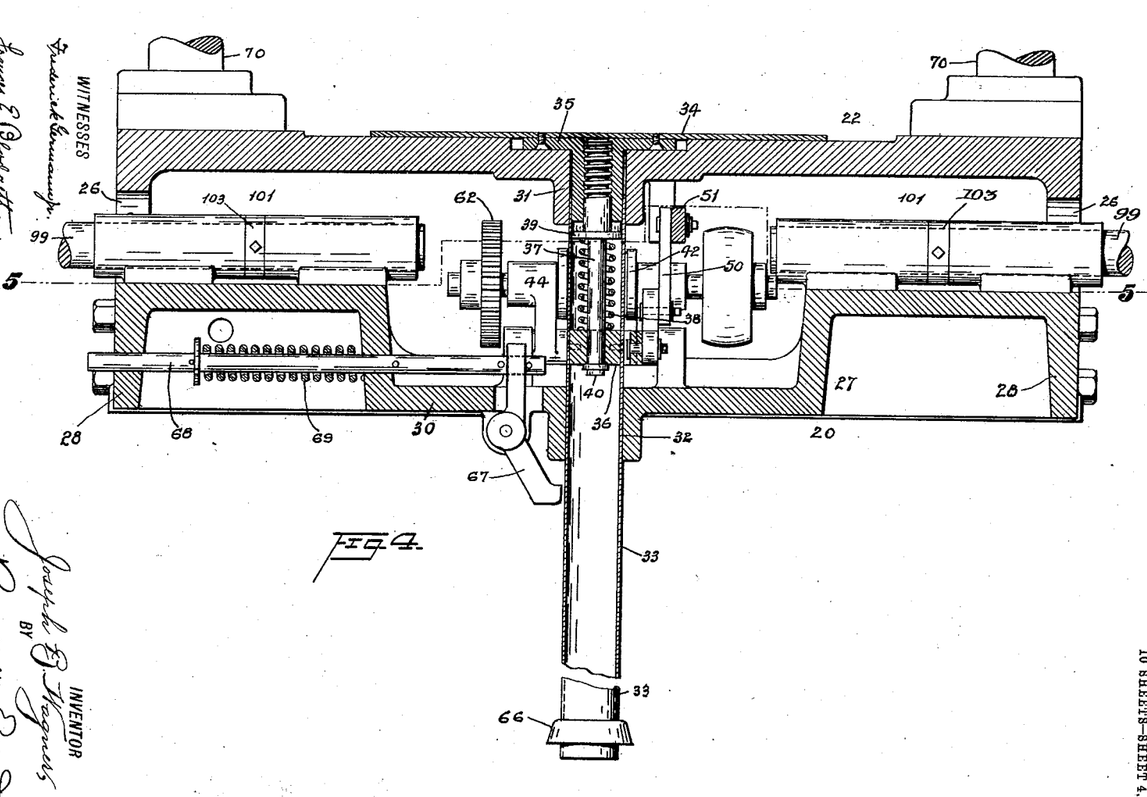
Fig. 4 is a vertical section from right to left of the machine, taken on line 4—4 of Fig. 2, and looking rearward, as indicated by the arrow.
Figure 5:
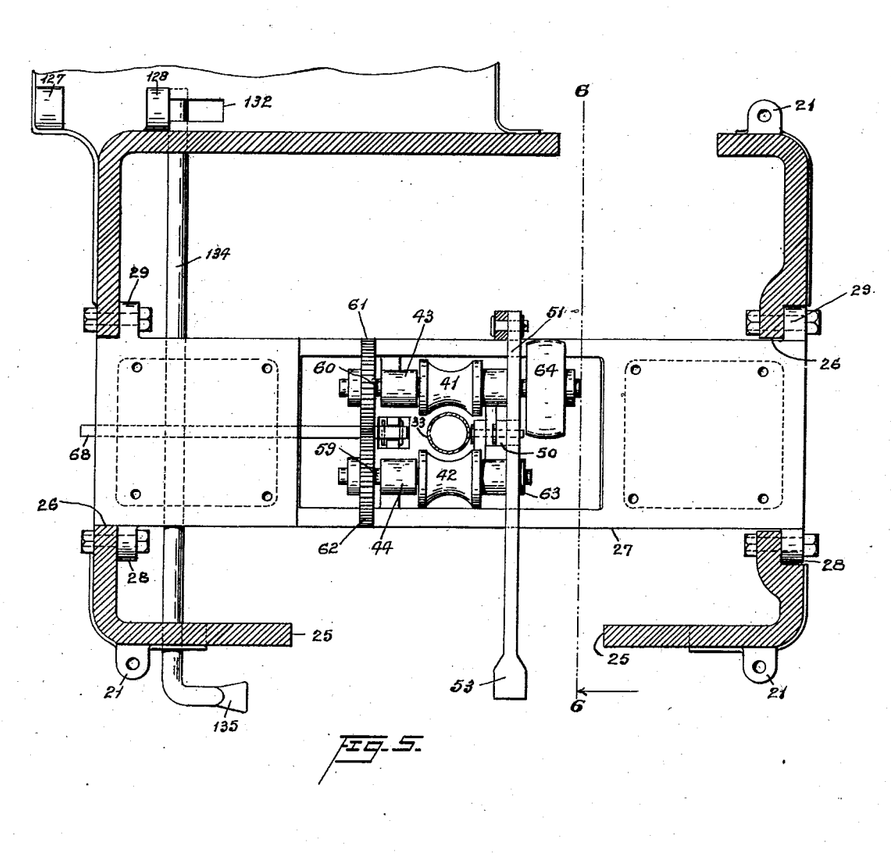
Fig. 5 is a horizontal section taken through the base portion of the machine, on line 5—5 of Fig. 4.
Figure 6:
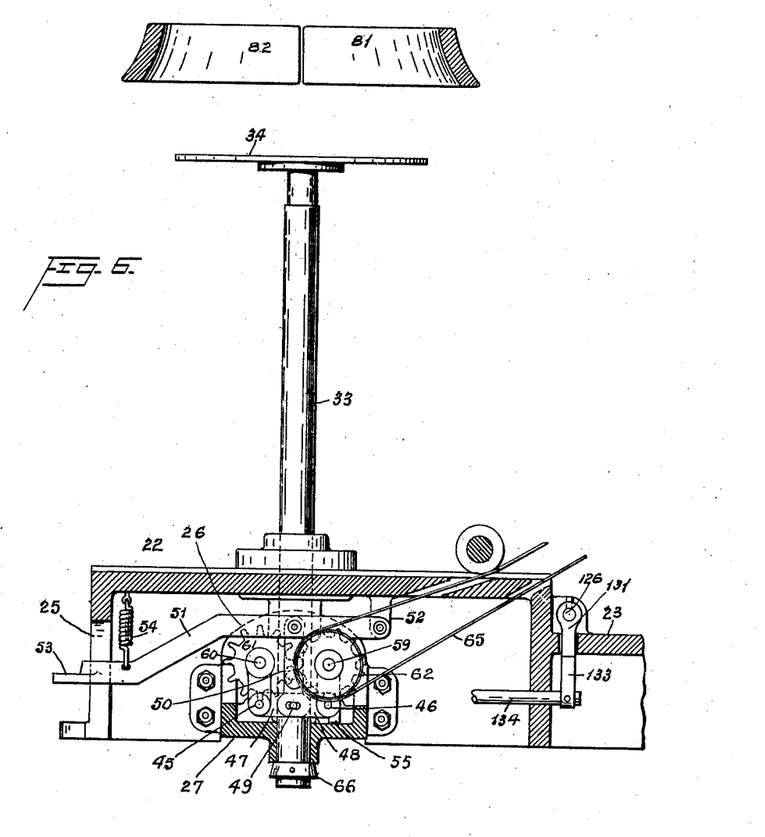
Fig. 6 is a vertical section on line 6—6 of Fig. 5, showing the barrel head carrier elevated.
Figure 7:
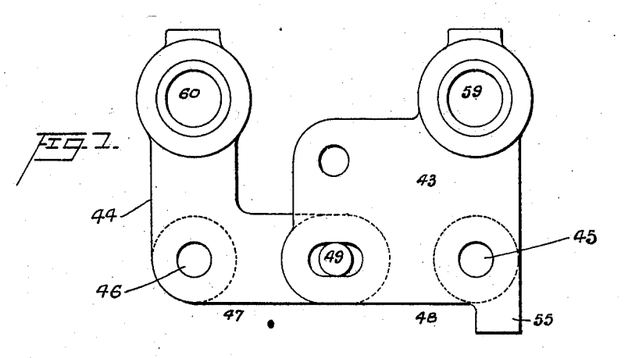
Fig. 7 is a detail side view of certain pivotal brackets carrying friction rollers adapted to engage the plunger of said barrel head carrier.
Figure 8:
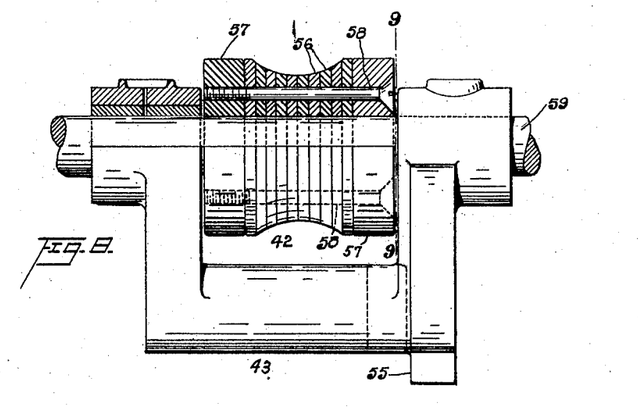
Fig. 8 is an end view of one of said brackets, showing the friction roll partly in section.
Figure 9:
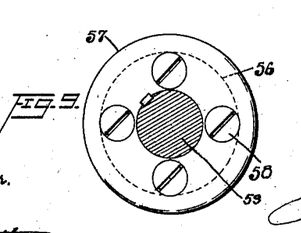
Fig. 9 is a detail section on line 9—9 of Fig. 8, looking in the direction indicated by the arrow.
Figure 10:
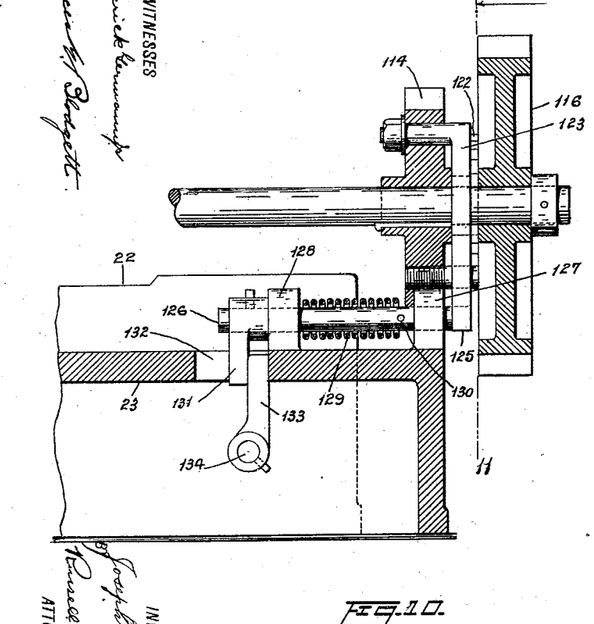
Fig. 10 is a detail vertical section on line 10—10, Fig. 3, looking in the direction indicated by the arrow, and certain of the parts being in central section for clearness, illustrating certain clutch means for actuating the barrel compressing ring hereinafter described.
Figure 11:
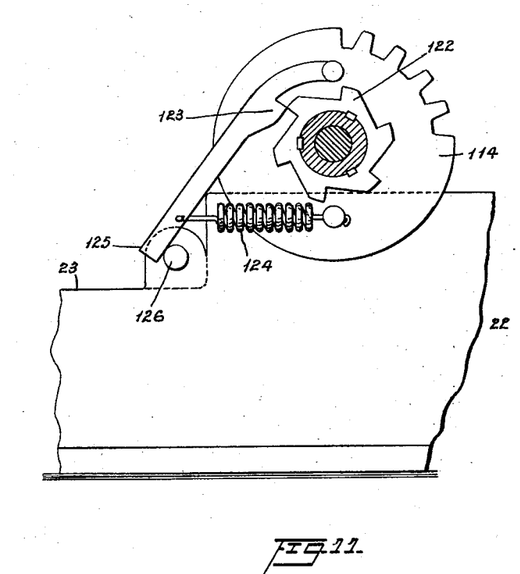
Fig. 11 is a view on line 11, 11 of Fig. 10, looking in the direction indicated by the arrow.
Figure 12:
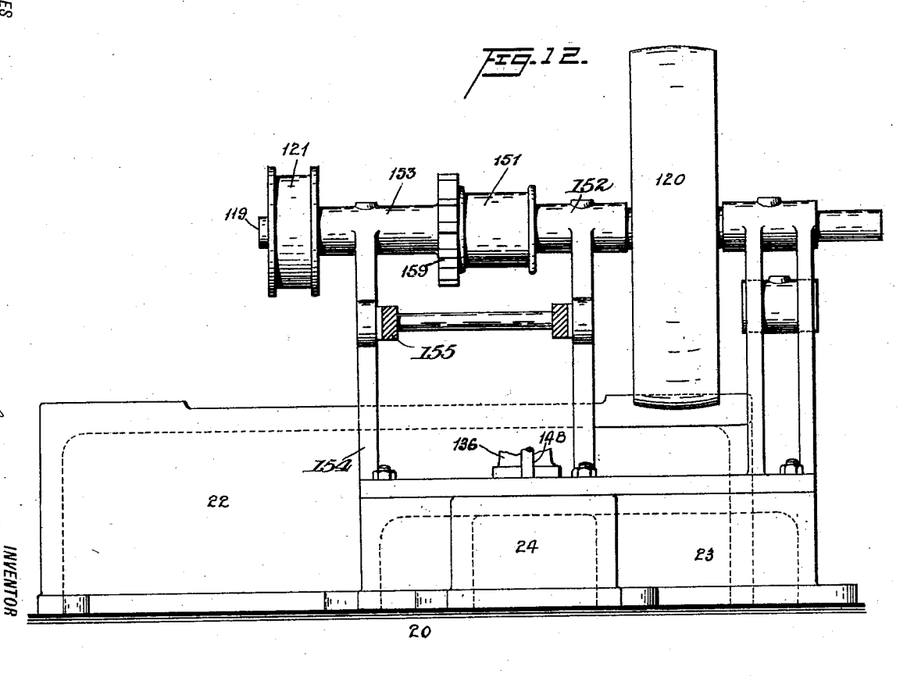
Fig. 12 is a detail rear view of certain rear parts of the machine, partly in elevation and partly in section on line 12—12 of Fig. 2, looking toward the front of the machine, as shown by the arrow.
Figure 13:
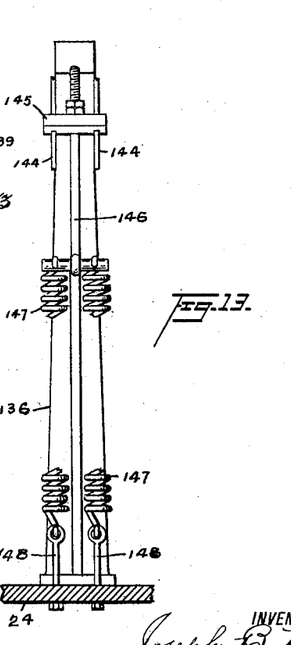
Fig. 13 shows in rear elevation, apart from the rest of the machine, a certain standard for supporting the hoop driving means.
Figure 14:
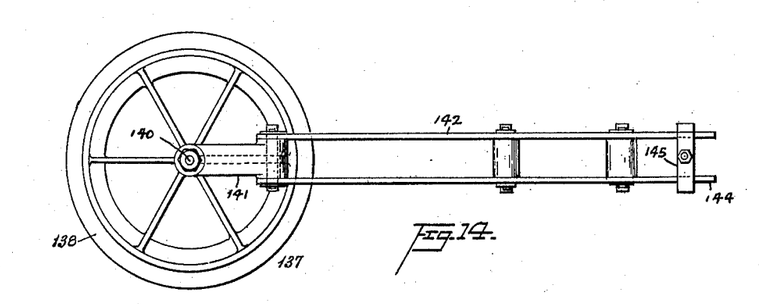
Fig. 14 is a plan of the hoop driving plate and arm by which it is supported on said standard shown in Fig. 13.
Figure 16:
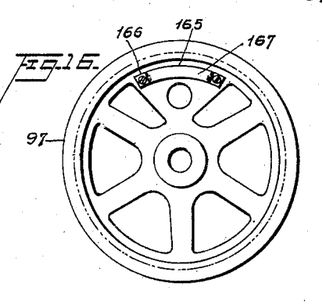
Fig. 16 is a detail view illustrating a certain cam which drops a head-holding table.

After the barrel head has been brought into position and the staves of the barrel compressed into proper relation thereto, by means of the mechanism above described, the table 34 is dropped automatically away from the head, which is now held by the barrel itself, back to its lowest position, as shown in Fig. 4. This is effected by means of a cam 165 on one of the gear wheels 97, and which cam is so placed that as the compressing ring closely approaches its lowest position, the said cam engages and pushes inward the rod 68 (see Fig. 4) which releases the dog 67. Said cam 165 which is clearly shown in Figs. 1 and 16, has beyond its incline 166 which pushes the rod 68 inward, a flat portion 167 of considerable length, so that as the gear wheel 97 stops with the compression ring in clamping position on the barrel, the dog is still held away from the plunger 33 and ample opportunity given for said plunger to drop. When the compressing ring starts upward the cam 165 clears the rod 68 and a spring 69 returns said rod outward, and the dog 67 to locking position. The cam 165 then moves around with the wheel 97 until it again reaches its lowest point when the compressing ring is brought downward. When the compressing ring is brought downward in gripping relation to a barrel, a hoop is laid upon the end of the barrel and driven tightly on into its place by means next to be described. Upon the extreme rear portion 24 of the base of the machine is mounted an upright standard 136, and to the top of which standard is connected a hoop-driving member or plate 137 which is adapted to be brought forcibly down upon the hoop to drive the same. This hoop-driving member is preferably in the form of an annular rim 138 which is connected by spokes to a hub 139, receiving a bolt 140 extending into a bracket 141. This bracket 141 is connected by upper and lower pairs of swinging arms 142, 143 to the said standard 136, and which arms thus permit the hoop-driving member to move up and down while keeping it always parallel to the plane of the hoop to be driven, as will be understood. Each of said upper and lower arms 142, 143 comprises a pair of levers disposed at opposite sides of the bracket and standard which they connect, as shown in Fig. 14, more particularly.

The lower pair of levers, constituting the lower arm 143 are extended rearward upon the standard 136, as at 144, and across their upper edges rests a cross-bar 145. A rod 146 extends upward through said crosspiece 145, and has its upper end threaded to receive an adjusting nut, while to the lower end of said rod are attached tension springs 147, 147, which are suitably secured as at 148 to the base of the machine, and serve to normally elevate the arms 142, 143 and thus swing the hoop-driving member 137 up out of the way, while the operator is inserting a head and placing a hoop in position on another barrel.

For pulling the hoop-driving member 137 down to drive a hoop a tongue 150, or friction block preferably of wood, hangs downward from the lower pair of arms 143, being pivoted thereto as at 149. This tongue lies adjacent to a friction roller 151 on the main driving shaft 119, said friction roller being between bearings 152, 153 for said driving shaft on the frame or support 154 therefor which projects upward from the middle portion 23 of the base. Upon the said frame 154 is pivoted a bracket 155 which provides at its upper part bearings 156 and 157 for a horizontal shaft which carries between said bearings a second friction roll 158, driven from the first mentioned friction roll 151 by means of star gears 159, 160 at the ends of said rollers and fast thereto.

The tongue or friction block 150 lies between the rollers 151, 158, and normally said rollers are loose from the tongue. Means are provided, however, for swinging the bracket 155 of the roller 158, when desired, so as to grip the tongue 150 between the two rollers, and thus the rotation of said rollers will pull the tongue downward and thus swing the arms 142, 143 to bring the hoop-driving member 137 down upon the hoop with a percussive blow. At the same time, the frictional grip of the said rollers upon the tongue 150 will permit slipping if necessary.

Figure 2:
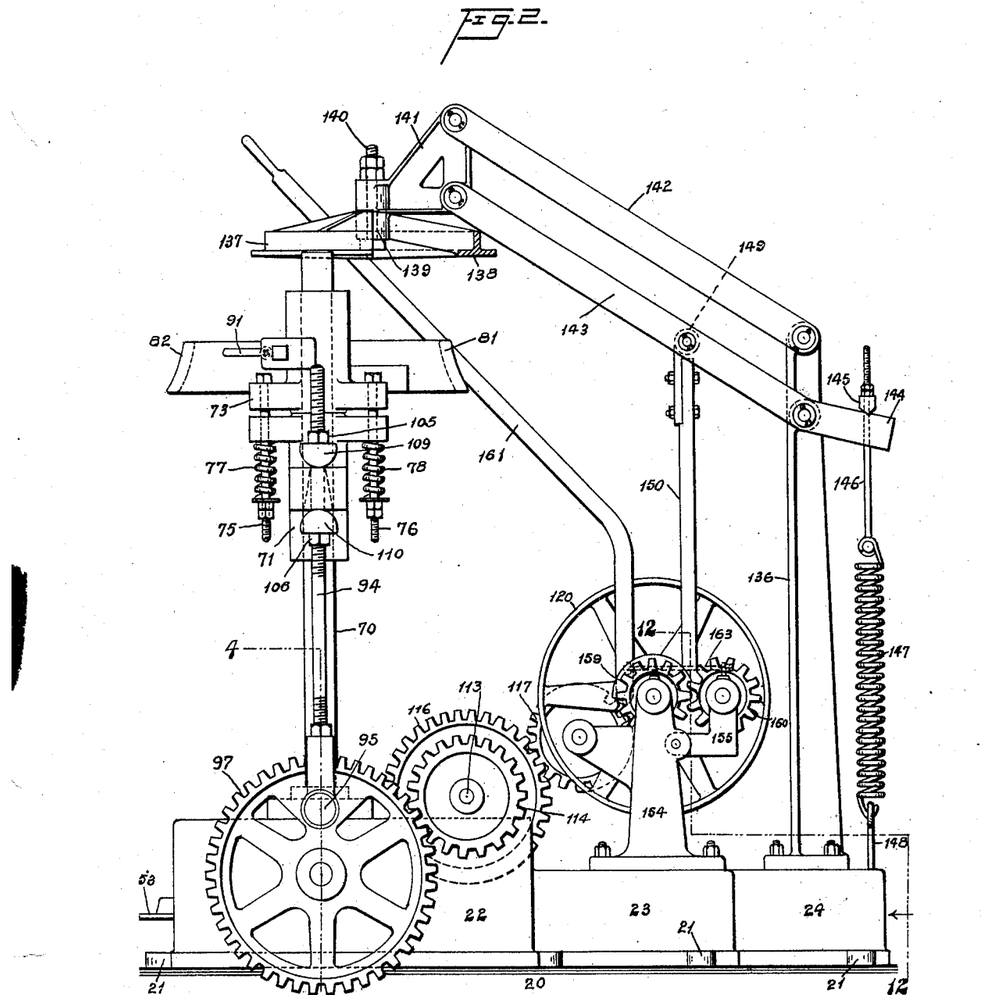
Fig. 2 is a side elevation of the machine, looking in the direction indicated by the arrow *x* on Fig. 3.
Figure 3:
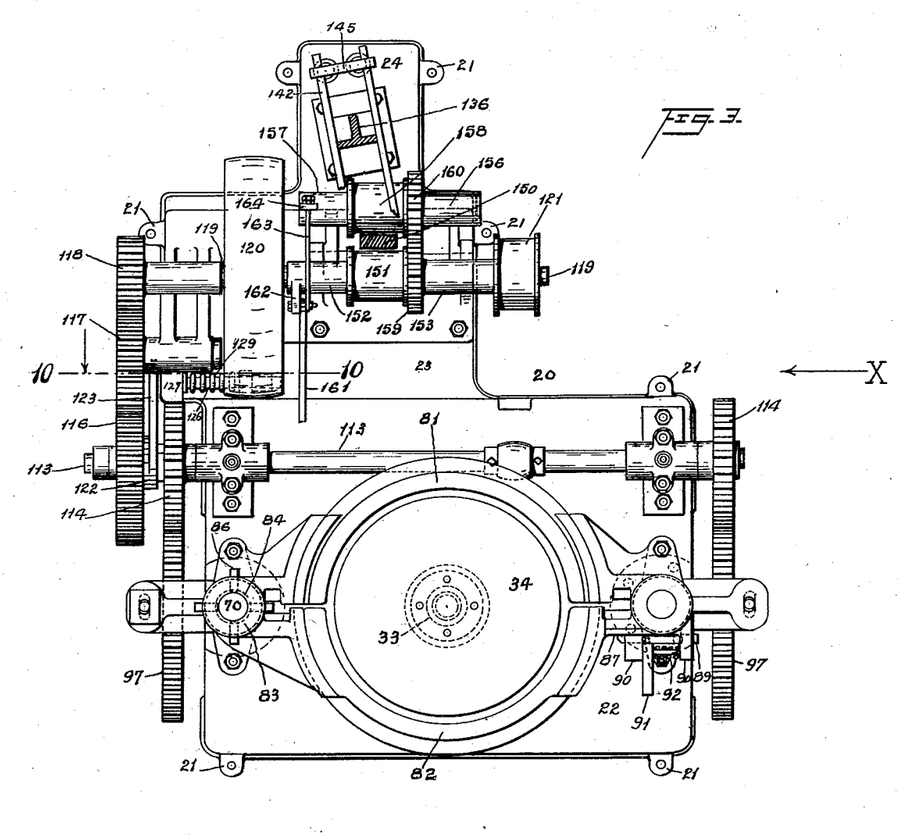
Fig. 3 is a plan of the machine.

For swinging the bracket 155 of the friction roller 158 a lever 161 is fulcrumed upon a lug 162 of the frame or support 154 and connected by a link 163 to the said bracket, whereby swinging of the lever toward the front of the machine will swing the bracket, and bring the head-driving plate 137 down upon the hoop. As soon as the lever is released, the said plate 137 will be returned to its former elevated position by the springs 147 before described. The handle of this lever 161 extends to the front of the machine, where it is readily accessible by the operator, as shown in Fig. 2 of the drawings.

Having thus described the invention, what I claim is:

1. In a barrel heading machine, the combination with a base providing vertical bearings, of a plunger adapted to slide in said bearings, a table at the top end of said plunger above the said base, a stop at the lower part of said plunger, friction rollers at opposite sides of said plunger intermediate of its ends, means for moving said friction rollers into and out of engagement with the plunger, a catch adapted to engage the said stop on the plunger, means for operating said catch, and driving means.

2. In a barrel heading machine, the combination with a base providing vertical bearings, of a plunger adapted to slide in said bearings, a table at the top end of said plunger above the said base, friction rollers at opposite sides of said plunger intermediate of its ends, means for moving said friction rollers into and out of engagement with the plunger, and driving means.

3. In a barrel heading machine, the combination with a base providing bearings, of a plunger mounted in said bearings, a table at the top end of said plunger above said base, brackets hinged to said base and adapted to swing toward and away from the plunger at opposite sides thereof, friction rollers mounted in said brackets, star wheels transmitting motion between said rollers, means for swinging said brackets, and driving means.

4. In a barrel heading machine, the combination with a base providing bearings, of a plunger mounted in said bearings, a table at the end of said plunger above said base, brackets hinged to said base at opposite sides of said plunger, and having overlapping extensions with slots therein, friction rollers mounted in said brackets, star wheels transmitting motion between said friction rollers, a lever, a link connecting said lever to said slotted extensions of the bracket, and driving means.

5. In a barrel heading machine, the combination of a base comprising a box-like top portion and a lower supplemental plate, said top section and plate providing a chamber between themselves and having alined bearings, a plunger mounted in said bearings, a table on said plunger above said base, friction rollers at opposite sides of said plunger in said chamber, means for moving said friction rollers into and out of engagement with the plunger, and driving means.

6. In a barrel heading machine, the combination of a base comprising a hollow box-like casting with openings at its sides, a supplemental plate secured at its ends to said casting, a plunger having bearings in said base, a table at the top of said plunger above the base, friction rollers at opposite sides of said plunger upon said supplemental plate, means for moving said friction rollers into and out of engagement with the plunger, a stop on said plunger, a catch adapted to engage said stop, a spring normally holding said catch in engagement with said stop, means for releasing said catch, and driving means.

7. In a barrel heading machine, the combination with a base providing bearings, of a plunger adapted to slide in said bearings, a table at the top of said plunger above the base, friction rollers at opposite sides of said plunger, means for moving said friction rollers into and out of engagement with the plunger, a stop on said plunger, a catch adapted to engage said stop, means for operating said catch, a gear wheel having a cam adapted to actuate said operating means, and means for driving said gear wheel and friction rollers.

8. In a barrel heading machine, the combination of a base providing alined bearings, a tube adapted to slide in said bearings, a fixed interior collar in said tube, a flanged stem adapted to slide in said collar, a spring between said flange and collar adapted to force the stem upward, the outer end of said stem being threaded, a table having a threaded socket to receive said threaded stem, friction rollers adapted to engage said tubular plunger from its opposite sides, and means for moving said friction rollers into and out of engagement with said plunger.

9. In a barrel heading machine, the combination of a hollow box-like base having openings at its sides, a supplemental plate inserted in the lower parts of said openings, having a centrally depressed middle portion, shaft bearings on the high ends of said supplemental plate, a plunger working vertically in said base, friction rollers pivoted upon the low portion of the supplemental plate at opposite sides of the said plunger and adapted to move toward or away from said plunger, means for moving said friction rollers, a table on said plunger, posts projecting upward from said base, a compressing ring having its ends slidably mounted on said posts, shafts in said bearings of the supplemental plate, wheels on said shafts having crank pins, connecting rods between said crank pins and ends of the compressing ring, and driving means.

10. In a barrel heading machine, the combination of a base, a plunger sliding vertically in said base, a table on the top of said plunger, a stop at the lower part of said plunger, friction rollers adapted to engage said plunger from opposite sides, means for moving said friction rollers, a catch adapted to engage said stop on the plunger, a sliding rod adapted to operate said catch, posts on said base, a compressing ring adapted to slide on said posts, crank pins and connecting rods for sliding said compressing ring, a cam adapted to be brought into engagement with said sliding rod by revolution of the crank pins, and driving means.

11. In a barrel heading machine, the combination of a base, upright posts on said base, a compressing ring slidably receiving said posts at opposite points of itself outside its opening, sleeves on said posts beneath said ring, springs normally holding said sleeves and ring together, and means for sliding said sleeves on said posts, whereby upward sliding of said sleeves moves the compressing ring positively and downward sliding moves it elastically.

12. In a barrel heading machine, the combination of a base, upright posts on said base, a compressing ring slidably receiving said posts at opposite points of itself outside its opening, sleeves on said posts beneath said ring, springs normally holding said sleeves and ring together, and means for sliding said sleeves on said posts, whereby upward sliding of the sleeves moves the ring positively and downward sliding movement of the sleeve moves it elastically, lateral arms on said sleeves, rotary members on said base having crank pins, connecting rods extending from said crank pins to said arms of the sleeves, and means for driving said rotary member.

13. In a barrel heading machine, the combination with a base, posts on said base, a compressing-ring section having eyes receiving said posts, one of said eyes having a reduced portion, a second ring section having at one end an eye receiving said reduced portion of the first section, means for releasably locking the other end of said section to the first section, and means for sliding said compressing ring on said posts.

14. In a barrel heading machine, the combination of a base, upright posts on said base, a compressing-ring section having eyes receiving said posts, one of the eyes having a reduced portion and the other a downwardly facing shoulder, a second ring section having at one end an eye receiving said reduced portion of the first section and adapted at its other end to underlie the said shoulder, means for securing said last-mentioned end beneath said shoulder, and means for sliding said first-mentioned compression-ring section on said posts.

15. In a barrel heading machine, the combination of a base, posts on said base, a compressing ring section having eyes receiving said posts, one of said eyes having an upper reduced portion and the other a downwardly facing shoulder and lateral lugs, a second ring section having at one end an eye receiving said upper reduced portion of the first section and adapted at its other end to underlie the said shoulder, means holding said second section on said reduced portion, a spring controlled latch in said lugs on the first mentioned ring section adapted to hold the ring sections together, and means for sliding said compressing ring on said posts.

16. In a barrel heading machine, the combination of a base, posts on said base, a compressing ring adapted to slide on said posts, gear wheels mounted on said base having crank pins, connecting rods between said crank pins and compressing ring, a counter-shaft on said base, gears fast on said shaft meshing with the first mentioned gear-wheels, a loose gear on said shaft adjacent to one of the gears fast thereon, a ratchet wheel fast to said loose gear, a pawl on the fast gear adapted to engage said ratchet wheel, a spring normally holding said pawl in engagement, a trip adapted to engage the said pawl and release it at the end of a complete rotation, and means for driving said loose gear.

17. In a barrel heading machine, the combination of a base, posts on said base, a compressing ring adapted to slide on said posts, rotary members on the said base, crank pins on said rotary members, connecting rods between said crank pins and compressing ring, a shaft on said base, gears fast on said shaft adapted to drive said rotary members, a loose gear on said shaft adjacent to one of the gears fast thereon, a ratchet wheel fast to said loose gear, a pawl pivoted on the fast gear adapted to engage said ratchet wheel, a spring normally holding said pawl in engagement, a movable stop on the said base, means normally holding said stop in the path of the outer end of said pawl, means for retracting said movable stop, and means for driving said loose gear.

18. In a barrel heading machine, the combination of a base adapted to support a barrel, upright posts on said base, a compressing ring adapted to slide on said posts, rotary members mounted on said base, crank pins on said rotary members, connecting rods between said crank pins and compressing ring, a shaft on said base, gears on said shaft adapted to positively drive said rotary members and being fast on said shaft, a loose gear on said shaft adjacent to one of the fast gears, a ratchet wheel fast to said loose gear, a pawl pivoted on the fast gear, a spring normally holding said pawl in engagement with said ratchet wheel, a sliding rod on the base, a spring normally projecting said rod into the path of the pawl, a rock shaft on the base, an arm on said rock shaft engaging said sliding rod, means for turning said rock shaft, and means for driving said loose gear.

19. In a barrel heading machine, the combination, of a base for a barrel to stand on, a table movable upward from said base, and having a plunger extending downward therethrough, means for sliding said plunger upward at will, posts on said base at opposite sides of the table, sleeves adapted to slide on said posts, and comprising a ring carried by said sleeves between said posts, said ring having a hinged section, means for locking it in closed position, cranks at opposite sides of said base, rods connecting said cranks to said sleeves, a driving shaft, a train of gears between said driving shaft and cranks, a clutch in said train of gears, means for actuating said clutch to produce a single upward or downward movement of the compression ring, and hoop driving means.

20. In a barrel heading machine, the combination of a base providing an annular seat for the edges of an open end of a barrel, a plunger extending through said base inside said annular seat, a table at the top of said plunger, and means for raising and lowering said plunger.

21. In a barrel heading machine, the combination of a base providing vertical bearings and a seat around said bearings for the edges of an open end of a barrel, a plunger adapted to slide in said bearings, a table at the top of said plunger adapted to be elevated above the base inside a barrel, and means for raising and lowering said plunger.

22. In a barrel heading machine, the combination of a base providing an annular seat for the edges of an open end of a barrel, a plunger extending through said base inside said annular seat, a table at the top of said plunger, and means beneath said seat of the base for raising and lowering said plunger.

23. In a barrel heading machine, the combination of a hollow base providing top and bottom bearings and an upper seat around said bearings for the edges of an open end of a barrel, a plunger adapted to slide in said bearings, a table at the top of said plunger, and means within said hollow base for raising and lowering said plunger.

24. In a barrel heading machine, the combination of a hollow base providing an annular seat for the edges of an open end of a barrel, a plunger extending through said base inside said annular seat, a stop at the lower part of said plunger, a table at the top of said plunger, means for raising and lowering said plunger, a catch adapted to engage the said stop on the plunger, and means for operating said catch.

25. In a barrel heading machine, the combination with a base providing bearings, of a plunger adapted to slide in said bearings, a table at the top of said plunger above the base, means for raising and lowering said plunger, a stop on said plunger, a catch adapted to engage said stop, means for operating said catch, a gear wheel having a cam adapted to actuate said operating means, and means for driving said gear wheel.

26. In a barrel heading machine, the combination with a base providing a seat for the edges of an open end of a barrel, a plunger extending slidably through said seat and comprising longitudinal sections in slidable relation, a spring between said plunger sections, a table upon said plunger, and means for raising and lowering said plunger.

27. In a barrel heading machine, the combination of a base providing an annular seat for the edges of an open end of a barrel, a tube extending slidably through said base inside said annular seat, a collar fixed in said tube, a stem adapted to slide in said collar, a table upon said stem outside the tube, a helical spring between said table and collar, and means for raising and lowering said plunger.

28. In a barrel heading machine, the combination of a base, a plunger sliding vertically in said base, a table on the top of said plunger, a stop at the lower part of said plunger, means for raising and lowering said plunger, a catch adapted to engage said stop on the plunger, a sliding rod adapted to operate said catch, posts on said base, a compressing ring adapted to slide on said posts, crank pins and connecting rods for sliding said compressing ring, a cam adapted to be brought into engagement with said sliding rod by revolution of the crank pins, and driving means.

29. In a barrel heading machine, the combination of a base, a plunger sliding vertically in said base, a table on the top of said plunger, a stop at the lower part of said plunger, friction rollers adapted to engage said plunger from opposite sides, means for moving said friction rollers, a catch adapted to engage said stop on the plunger, posts on said base, a compressing ring adapted to slide on said posts, means for sliding said compressing ring and releasing said catch in conjunction, and driving means.

30. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a rotary member on said base having a crank pin, a connecting rod between said crank pin and compressing ring, and means actuated by said rotary member for releasing the plunger catch.

31. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a rotary member on said base having a crank pin, a connecting rod between said crank pin and compressing ring, and means for imparting intermittent half revolutions to said rotary member.

32. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a rotary member on said base having a crank pin, a connecting rod between said crank pin and compressing ring, means for imparting intermittent half revolutions to said rotary member, and means for releasing said plunger catch at each complete revolution of said rotary member.

33. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a gear wheel on said base having a crank pin, a connecting rod between said crank pin and compressing ring, means for releasing the plunger catch at each complete revolution of said gear wheel, a second gear wheel engaging said first mentioned gear wheel and having half the number of teeth, a driving wheel in axial alinement with said second gear wheel, a clutch normally connecting said driving wheel and second gear wheel, and means for disengaging said clutch at the end of a complete rotation of the second gear wheel.

34. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a gear wheel on said base having a crank pin, a connecting rod between said crank pin and compressing ring, means for releasing the plunger catch at each complete revolution of said gear wheel, a second gear wheel engaging said first-mentioned gear wheel, a driving wheel in axial alinement with said second gear wheel, a clutch normally connecting said driving wheel and second gear wheel, and means for disengaging said clutch at a predetermined point of the rotation of said second gear wheel.

35. In a barrel heading machine, the combination of a base, posts on said base, a compressing ring adapted to slide on said posts, gear wheels mounted on said base having crank pins, connecting rods between said crank pins and compressing ring, a loose driving gear for said gear wheels, a projection fast to said loose gear, a pawl adapted to engage said projection and transmit rotation of the driving gear to the said gear wheels, a spring normally holding said pawl in engagement, a trip adapted to release the said pawl, and means for driving said loose gear.

36. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a gear wheel on said base having a crank pin, a connecting rod between said crank pin and compressing ring, means for releasing the plunger catch at each complete revolution of said gear wheel, a loose driving gear for said gear wheel, a projection fast to said loose gear, a pawl adapted to engage said projection and transmit rotation of the driving gear to the said gear wheel, a spring normally holding said pawl in engagement, a trip adapted to release the said pawl, and means for driving said loose gear.

37. In a barrel heading machine, the combination of a base adapted to support a barrel at its open end, a plunger slidable vertically in said base, a table at the top of said plunger adapted to support a barrel head, means for elevating said plunger, a catch adapted to hold said plunger in elevated position, posts on said base, a compressing ring slidable on said posts, a gear wheel on said base having a crank pin, a connecting rod between said crank pin and compressing ring, means for releasing the plunger catch at each complete revolution of said gear wheel, a loose driving gear for said gear wheel, a projection fast to said loose gear, a pawl adapted to engage said projection and transmit rotation of the driving gear to the said gear wheel, a spring normally holding said pawl in engagement, a movable stop on the said base, means for normally holding said stop in the path of the free end of said pawl, means for retracting said movable stop, and means for driving said loose gear.

JOSEPH B. WAGNER.

In the presence of—
PETER AMBROSE BRADY,
RUSSELL M. EVERETT.